(12) United States Patent
Blume et al.

(10) Patent No.: US 8,025,220 B2
(45) Date of Patent: Sep. 27, 2011

(54) CARDHOLDER LOCALIZATION BASED ON TRANSACTION DATA

(75) Inventors: Matthias Blume, San Diego, CA (US); Bruce D. Harris, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 492 days.

(21) Appl. No.: 11/936,728

(22) Filed: Nov. 7, 2007

(65) Prior Publication Data
US 2008/0110978 A1    May 15, 2008

Related U.S. Application Data

(60) Provisional application No. 60/865,390, filed on Nov. 10, 2006.

(51) Int. Cl.
*G06K 5/00*    (2006.01)
(52) U.S. Cl. ........ 235/380; 235/375; 235/379; 235/383; 705/40; 705/44
(58) Field of Classification Search .................. 235/375, 235/379, 380, 383; 705/40, 44
See application file for complete search history.

(56) References Cited

U.S. PATENT DOCUMENTS

| | | | |
|---|---|---|---|
| 6,505,168 B1 * | 1/2003 | Rothman et al. | 705/10 |
| 2002/0194119 A1 * | 12/2002 | Wright et al. | 705/38 |
| 2002/0194503 A1 * | 12/2002 | Faith et al. | 713/201 |
| 2003/0225651 A1 | 12/2003 | Chen | |
| 2004/0093265 A1 * | 5/2004 | Ramchandani et al. | 705/14 |
| 2004/0093268 A1 * | 5/2004 | Ramchandani et al. | 705/14 |
| 2005/0006227 A1 * | 1/2005 | Hao et al. | 204/192.34 |
| 2005/0021460 A1 | 1/2005 | Teague et al. | |
| 2005/0021492 A1 * | 1/2005 | Safaei et al. | 707/1 |
| 2005/0159996 A1 * | 7/2005 | Lazarus et al. | 705/10 |
| 2005/0182712 A1 | 8/2005 | Angell | |
| 2005/0198056 A1 * | 9/2005 | Dumais et al. | 707/101 |
| 2006/0006227 A1 * | 1/2006 | Williams | 235/380 |
| 2008/0035724 A1 * | 2/2008 | Vawter | 235/380 |

FOREIGN PATENT DOCUMENTS

| | | |
|---|---|---|
| WO | WO 98/54667 A | 12/1998 |
| WO | WO 00/55784 A | 9/2000 |
| WO | WO 01/35301 A | 5/2001 |
| WO | WO 2004/061733 A | 7/2004 |
| WO | WO 2007/004224 A | 1/2007 |

* cited by examiner

*Primary Examiner* — Daniel Hess
*Assistant Examiner* — Ali Sharifzada
(74) *Attorney, Agent, or Firm* — Mintz, Levin, Cohn, Ferris, Glovsky and Popeo, P.C.

(57) ABSTRACT

Methods and apparatus, including computer program products, for cardholder localization based on transaction data. In general, a determination of one or more possible base locations of a cardholder of a payment card may be initiated. Transactions of the cardholder may be associated with merchant customer base location profiles, where each of the merchant customer base location profiles models a distribution of base locations of customers with which a merchant has had a transaction. The one or more possible cardholder base locations may be derived from the merchant customer base location profiles. The one or more possible cardholder base locations may be used to determine a home or office location of a cardholder where such information is not otherwise available, to determine whether a cardholder has moved from a stated address, to determine if a cardholder has multiple residences, to detect fraud, and the like.

19 Claims, 5 Drawing Sheets

402

| | 10045 | 32345 | 38234 | 58493 | 83102 | 92011 | 92130 |
|---|---|---|---|---|---|---|---|
| Merchant | | | | | | | |
| Marriott Hotel - Honolulu | 423 | 364 | 342 | 325 | 521 | 127 | 321 |
| Marriott Hotel - Del Mar | 267 | 363 | 846 | 254 | 471 | 342 | 43 |
| Land's End Mail Order | 3641 | 895 | 467 | 932 | 235 | 263 | 316 |
| Chevron - Del Mar | 0 | 1 | 34 | 21 | 22 | 1283 | 2195 |
| Home Depot - Del Mar | 5 | 0 | 0 | 0 | 4 | 3142 | 3412 |
| Harrods, London | 12 | 43 | 21 | 2 | 0 | 33 | 12 |
| Pet Smart - Del Mar | 0 | 0 | 0 | 2 | 5 | 213 | 834 |
| Trader Joe's - La Jolla | 8 | 3 | 7 | 8 | 9 | 120 | 462 |
| San Diego Chargers Ticket Office | 0 | 0 | 0 | 0 | 0 | 534 | 954 |
| Ralphs - Mira Mesa | 6 | 1 | 2 | 3 | 5 | 123 | 253 |
| Mammoth Mountain Ski Tickets | 25 | 67 | 45 | 77 | 89 | 435 | 823 |
| Dallas Cowboys Ticket Office | 0 | 1251 | 672 | 6 | 2 | 6 | 3 |

| Merchant | 10045 | 32345 | 38234 | 58493 | 83102 | 92011 | 92130 |
|---|---|---|---|---|---|---|---|
| Marriott Hotel - Honolulu | 423 | 364 | 342 | 325 | 521 | 127 | 321 |
| Marriott Hotel - Del Mar | 267 | 363 | 846 | 254 | 471 | 342 | 43 |
| Land's End Mail Order | 3641 | 895 | 467 | 932 | 235 | 263 | 316 |
| Chevron - Del Mar | 0 | 1 | 34 | 21 | 22 | 1283 | 2195 |
| Home Depot - Del Mar | 5 | 0 | 0 | 0 | 4 | 3142 | 3412 |
| Harrods, London | 12 | 43 | 21 | 2 | 0 | 33 | 12 |
| Pet Smart - Del Mar | 0 | 0 | 0 | 2 | 5 | 213 | 834 |
| Trader Joe's - La Jolla | 8 | 3 | 7 | 8 | 9 | 120 | 462 |
| San Diego Chargers Ticket Office | 0 | 0 | 0 | 0 | 0 | 534 | 954 |
| Ralphs - Mira Mesa | 6 | 1 | 2 | 3 | 5 | 123 | 253 |
| Mammoth Mountain Ski Tickets | 25 | 67 | 45 | 77 | 89 | 435 | 823 |
| Dallas Cowboys Ticket Office | 0 | 1251 | 672 | 6 | 2 | 6 | 3 |

FIG. 4A

| Merchant | 10045 | 32345 | 38234 | 58493 | 83102 | 92011 | 92130 |
|---|---|---|---|---|---|---|---|
| Marriott Hotel - Honolulu | 0.1743 | 0.1496 | 0.1404 | 0.1332 | 0.2130 | 0.0546 | 0.1349 |
| Marriott Hotel - Del Mar | 0.1038 | 0.1399 | 0.3244 | 0.0977 | 0.1806 | 0.1333 | 0.0202 |
| Land's End Mail Order | 0.5378 | 0.1325 | 0.0693 | 0.1377 | 0.0349 | 0.0398 | 0.0481 |
| Chevron - Del Mar | 0.0013 | 0.0011 | 0.0102 | 0.0063 | 0.0065 | 0.3597 | 0.6149 |
| Home Depot - Del Mar | 0.0014 | 0.0005 | 0.0004 | 0.0003 | 0.0008 | 0.4776 | 0.5190 |
| Harrods, London | 0.1080 | 0.3012 | 0.1537 | 0.0241 | 0.0092 | 0.2604 | 0.1434 |
| Pet Smart - Del Mar | 0.0042 | 0.0028 | 0.0023 | 0.0034 | 0.0059 | 0.2028 | 0.7785 |
| Trader Joe's - La Jolla | 0.0194 | 0.0094 | 0.0147 | 0.0150 | 0.0161 | 0.1960 | 0.7294 |
| San Diego Chargers Ticket Office | 0.0030 | 0.0020 | 0.0017 | 0.0011 | 0.0009 | 0.3563 | 0.6350 |
| Ralphs - Mira Mesa | 0.0249 | 0.0097 | 0.0107 | 0.0111 | 0.0151 | 0.3069 | 0.6216 |
| Mammoth Mountain Ski Tickets | 0.0186 | 0.0441 | 0.0299 | 0.0495 | 0.0568 | 0.2777 | 0.5235 |
| Dallas Cowboys Ticket Office | 0.0023 | 0.6366 | 0.3424 | 0.0039 | 0.0017 | 0.0065 | 0.0066 |

CARDHOLDER LOCALIZATION BASED ON TRANSACTION DATA

CROSS REFERENCE TO RELATED APPLICATIONS

This application claims the benefit of U.S. Provisional Patent Application entitled "CARDHOLDER LOCALIZATION BASED ON TRANSACTION DATA", filed Nov. 10, 2006, Application Ser. No. 60/865,390, the contents of which are hereby fully incorporated by reference.

BACKGROUND

The present disclosure relates to data processing by digital computer, and more particularly to cardholder localization based on transaction data.

In general, a cardholder of a payment card, such as a credit card or debit card, may perform transactions with the payment card, where the payment card is used to settle the transactions. The transactions of the payment card may be processed in a system that includes parties that perform various roles.

FIG. 1 is a diagram of a system 100 in which a transaction may be performed with a payment card. In general, the system includes a cardholder 105, a merchant 110, an acquirer 115, an association 120, a processor 125, and an issuer 130. The flow between the parties of the system 100 represented by arrows may represent a flow of information during payment processing; however, there may be other flows of information between the parties; there may be fewer, different, or more parties; and in other systems payment processing flows may differ.

In general, the cardholder 105 may be issued a payment card by a bank or other organization that is the issuer 130; the merchant 110 may offer goods or services to the cardholder 105; the acquirer 115 may be a bank or organization that processes payment card transactions for the merchant 110; the association 120 may be a card association, such as VISA INTERNATIONAL SERVICE ASSOCIATION, which performs interchange (e.g., between processors and acquirers); and the processor 125 may provide card processing services to the issuer 130. To authorize a payment card for settlement of a transaction, the cardholder 105 may present a payment card to the merchant 110, which may obtain authorization for the card for a transaction amount by contacting the acquirer 115, which may use the association 120 to contact the processor 125 to authorize the payment card. Then, to settle the transaction, the acquirer 115 may send batches of transaction data to the association 120, which may debit the processor 125 and credit the acquirer 115, which in turn may result in a credit to the merchant 110.

The issuer 130 may have access to a stated location of a cardholder 105 based on a location to which statements are sent to the cardholder 105.

SUMMARY

The subject matter disclosed herein provides methods and apparatus, including computer program products, that implement techniques related to cardholder localization based on transaction data.

In one aspect, a determination of one or more possible base locations of a cardholder of a payment card is initiated. Transactions of the cardholder are associated with merchant customer base location profiles, where each of the merchant customer base location profiles characterizes geographic base locations of customers with which a merchant has had a transaction. The one or more possible base locations of the cardholder are derived from the merchant customer base location profiles and are provided.

In a related aspect, a request for one or more possible cardholder base locations is received. One or more possible cardholder base locations is determined, where the determining includes generating a list of locations and determining the one or more possible base locations of the cardholder from probabilities associated with the list of locations. Each of the locations is a base location associated with a probability that the base location is one of the cardholder base locations, where the probability is derived from probabilities of customers of merchants with which the cardholder has had a transaction having the base location. The one or more possible base locations are provided.

The subject matter may be implemented as, for example, computer program products (e.g., as source code or compiled code tangibly embodied in computer-readable media), computer-implemented methods, and systems.

Variations may include one or more of the following features.

One or more possible base locations may be derived from merchant customer base location profiles by computing a product of probability values, each of the probability values being an estimate of a probability that a customer of a merchant has a particular base location.

Probabilities that a customer base location is a particular location associated with a merchant may be computed from frequencies of occurrences based on a training set of transactions of the merchants.

Merchant customer base location profiles may include smoothed geographic distributions, normalized geographic distributions, or both.

One or more possible base locations may be localized to a Zone Improvement Plan code or other geocode resolution. The resolution of one or more possible base locations may be localized to a Zone Improvement Plan code plus four resolution.

Merchant customer base location profiles may be derived from stated addresses of customers with which merchants have had a transaction. Stated addresses of customers may be part of the issuer's account profiles of the customers.

One or more possible base locations may be selected as the locations that have the highest probability of being a base location of the cardholder (e.g., where the cardholder resides or does business).

One or more possible base locations of a cardholder may be utilized in further processing. The further processing may include variable creation that involves pre-decision utilization or end-applications that may involve decision-making, such as first-party fraud detection or other fraud detection. For example, a determination may be made as to whether one or more possible base locations differ from a stated address of a cardholder or a previous base location of a cardholder. As another example, a notification that possible base locations differ from a stated address may be generated. As another example, one or more possible base locations may be used to target offers to specific cardholders, for example, based on geographic criteria. As another example, one or more possible base locations may be provided to a program that uses the base locations for further processing or to a display device. As another example, one or more possible base locations may be used for fraud detection (e.g., the stated address of a cardholder and a list of one or more possible base locations of a cardholder may be provided to a program that uses the information for fraud detection).

The subject matter described herein can be implemented to realize one or more of the following advantages. One or more possible base locations of a cardholder of a payment card may be determined based on transaction data of the cardholder. The determination may utilize transaction data of other cardholders. Transaction data of other cardholders may serve as a natural filter of transaction data that might otherwise be expected to lead to inaccurate results, such as transactions involving travel, mail order transactions, incorrect merchant location information from transactions, and the like.

A resolution of detecting one or more possible base locations may provide a sub-ZIP (Zone Improvement Plan) code resolution (e.g., a ZIP plus four code resolution).

Cardholder base locations may be inferred even when there are no merchants in an area of a cardholder's actual base location. For example, some customers of a set of merchants may come from an area where there are no merchants and such a pattern may be reflected in their transaction data and automatically integrated in probabilities of customer base locations.

Current transaction data may be used to generate automatically more current probabilities of base locations of customers of merchants (e.g., by updating merchant customer profiles with more current transaction data of customers). This may yield a system that is adaptive to the appearance of new merchants and to changes in consumer behavior, and may consequently not require periodic batch updates that would result in sudden changes in system performance.

Differences between stated addresses of cardholders and possible base locations of a cardholder that are inferred may be detected for a variety of uses, such as first-party fraud detection (e.g., cases where a person does not intend to pay a bill, e.g., resulting in detection and prevention), other fraud detection (e.g., a detection of multiple, likely locations may indicate that a payment card has been forged or is fraudulently being used in another location), skip-tracing (e.g. locating a cardholder who is in arrears on payments and whose actual base location is different than his/her stated address), marketing (e.g., for instances where a cardholder has moved, has multiple residences, has a long commute to a location different from their billing address, or has a billing address that is not a home address), and the like.

For parties of a payment card system that do not normally have access to a stated address of cardholders, locations of cardholders may be identified (e.g., associations might not have stated addresses that are associated with a payment card but may identify locations of a cardholder).

Probabilities may be normalized such that transactions in different areas might not cause a misleading result of possible base locations (e.g., probabilities may be normalized based on ZIP code census data such that a transaction in a large city does have too large of a weight against transactions in a smaller city where there may be fewer transactions with a merchant yet the few transactions may indicate a relatively stronger probability that a cardholder is located at a ZIP code associated with the merchant in the smaller city).

Details of one or more implementations are set forth in the accompanying drawings and in the description below. Further features, aspects, and advantages will become apparent from the description, the drawings, and the claims.

BRIEF DESCRIPTION OF THE DRAWINGS

FIGS. 4A-4B are block diagrams including first and second tables of geographic distributions of customers of merchants.

Like reference numbers and designations in the various drawings indicate like elements.

DETAILED DESCRIPTION

In general, in FIGS. 1-4, a cardholder may be a person or organization that has a payment card. A payment card may be any type of card used to settle transaction, such as a credit card, a debit card, a gift card, and the like. A base location of a cardholder may be a location where a cardholder resides, does business, and the like. A base location of a cardholder may be a base location in the sense that it need not reflect an actual or exact location of a cardholder and a cardholder may have one or more base locations. As an example of a base location, a cardholder may have a base location that reflects where they reside which may differ from locations where they perform transactions with a payment card.

Figure 1:
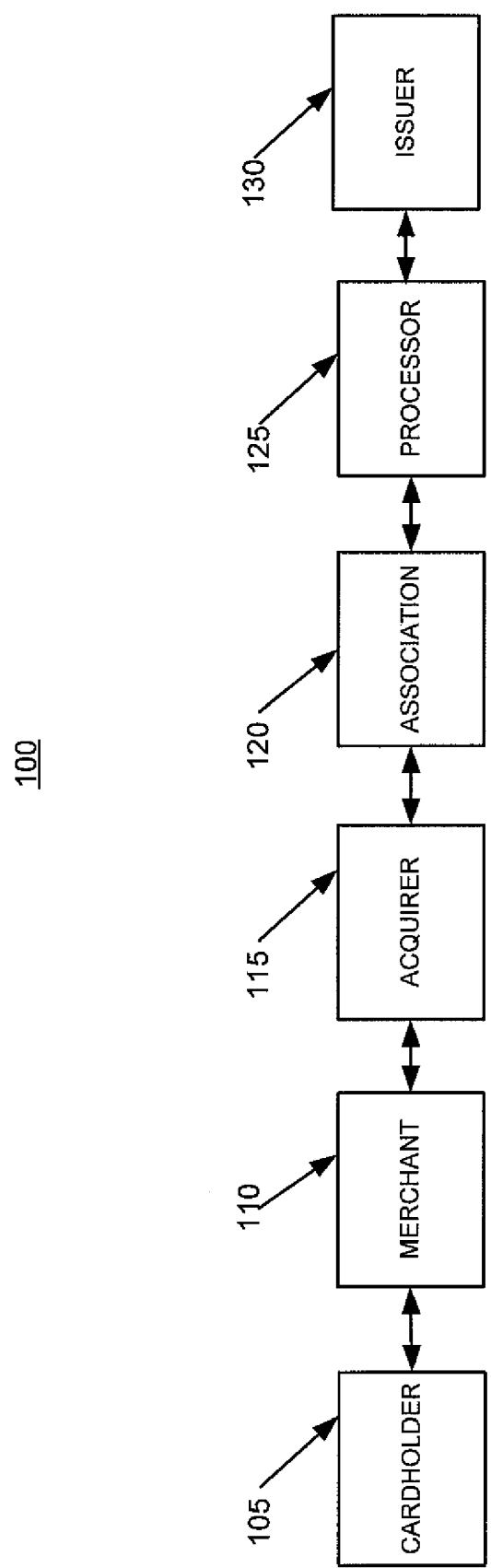
FIG. 1 is a diagram of a system in which a transaction may be performed with a payment card.
Figure 2:
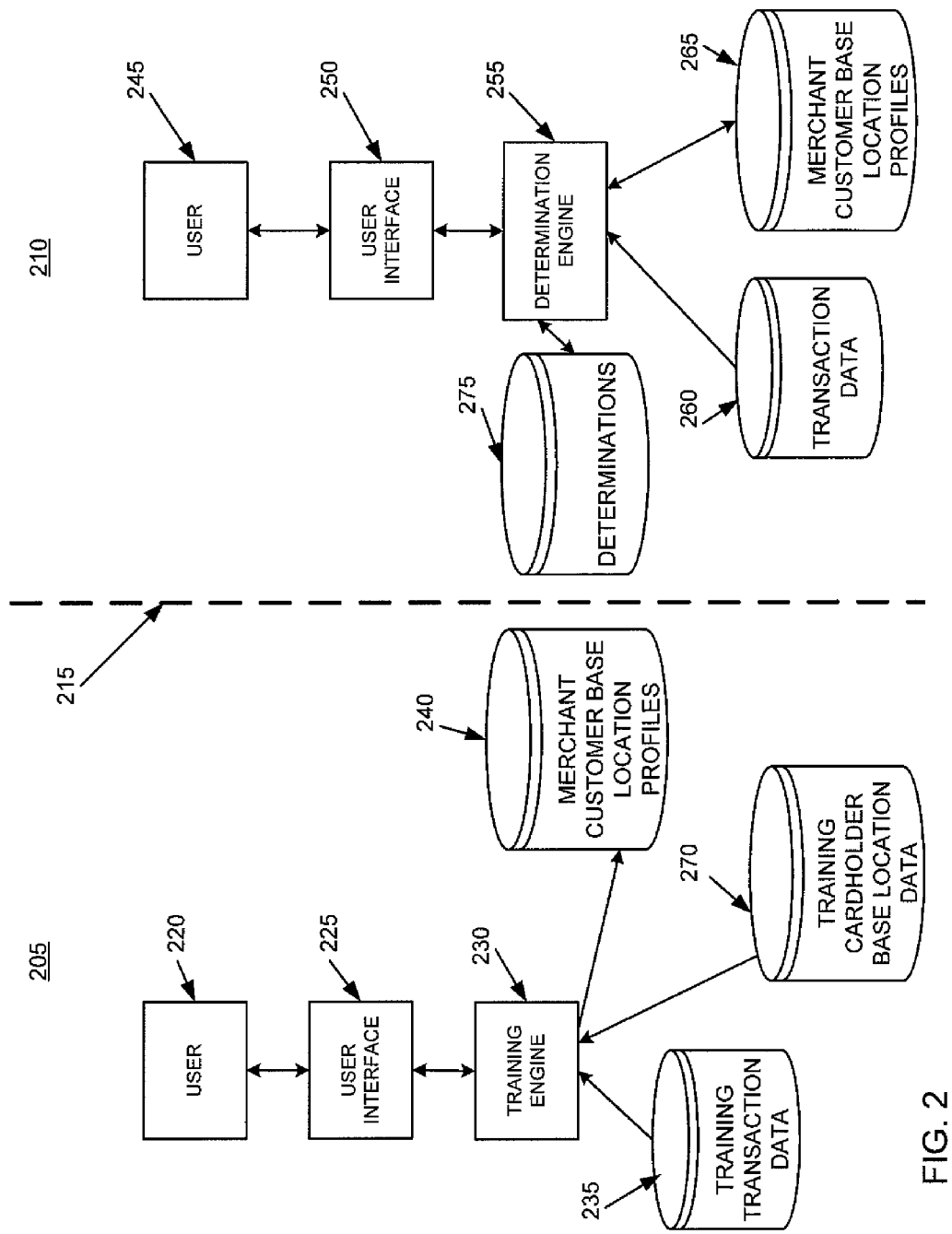
FIG. 2 is a diagram of systems including a training engine and determination engine, respectively.

FIG. 2 is a diagram of systems 205, 210 including a training engine 230 and determination engine 255, respectively. In general, the first system 205 may be used to generate merchant customer base location profiles 240 based on the training transaction data 235 and training cardholder base location data 270. The second system 210 may be used to generate one or more possible base locations of a cardholder based on the merchant customer base location profiles 265 and transaction data 260. The two systems 205, 210 may be related in that the merchant customer base location profiles 240 generated by the first system 205 may be used to generate the merchant customer base location profiles 265 of the second system 210 (i.e., the merchant customer base location profiles 265 may be the same as, or derived from, the merchant customer base location profiles 240).

The first and second systems 205, 210 are separated by a broken line 215. The separation of the systems may represent a separation of deployment of the systems 205, 210. For example, the first system 205 may be deployed at a party that generates the merchant customer base location profiles 240, which may be deployed as the merchant customer base location profiles 265 at a party that desires to determine possible base locations of cardholders of the customer. Either or both of the first and second systems 205, 210 may be deployed at any of the parties in FIG. 1 or at another party. For example, a developer of solutions for payment card processors may deploy the first system 205 to generate the merchant customer base location profiles 240 and the developer may assist in deploying the second system 210 at an association.

As an example of operation of implementations of the first and second systems 205, 210, the first system 205 may be used to generate profiles of merchant customer base locations stored in the merchant customer base location profiles 240, where the profiles include an expected distribution of customers for each merchant that is based on transactions between each merchant and their customers, where a stated address (e.g., a stated ZIP (Zone Improvement Plan) code) of the customers, which is stored in the training cardholder base location data 270, and training transaction data, which is stored in the training transaction data 235, may be used to generate the profiles. Then, the merchant customer base location profiles 240 may be deployed as the merchant customer base location profiles 265 for the second system 210. Then, for a cardholder of which one or more possible base locations is desired to be determined, a list of merchants with which the cardholder has had transactions may be generated based on the transaction data 260. Then, the list of merchants may be used to obtain expected geographic distributions of customers of the merchants in the list from the merchant customer base location profiles 265. The geographic distributions of customers across multiple merchants may be aggregated to generate an expected distribution of customers of the select group of merchants that may be used to determine one or more possible base locations of the cardholder.

In the first system 205, a user 220 may interact with the first system 205 through a user interface 225 to cause the training engine 230 to generate profiles of merchants that may be stored in the merchant customer base location profiles 240. The user interface 225 may be any type of user interface, such as a mouse-driven graphical user interface or a command-line interface. For example, the user 220 may start a program that includes the user interface 225 and the training engine 230 and the user may select an option to generate the merchant customer base location profiles 240 from the training transaction data 235 and the training cardholder base location data 270, and the training engine 230 may generate the merchant customer base location profiles 240.

The training engine 230 may be referred to as a training engine, as a process of generating the merchant customer base location profiles 240, or as aggregating information from training data from which determinations of possible base locations of cardholders may be made. In general, the training engine 230 generates a profile for a merchant to be stored in the merchant customer base location profiles 240 by performing computations with the training transaction data 235 and the training cardholder base location data 270. The training engine may generate profiles for as many merchants as there are in the training transaction data 235.

In general, the training transaction data 235, the training cardholder base location data 270, the transaction data 260, the first merchant customer base location profiles 240, the second merchant customer base location profiles 265, and the determinations 275 may each be a database or a database data structure (e.g., a table or index). The training transaction data 235 includes data from transactions across different merchants and may be derived from transaction data that is normally aggregated as part of a payment card processing system from one or more parties. For example, the training transaction data 235 may be a sampling of millions of transaction records of a particular issuer or a group of issuers and processors. The training transaction data 235 may be considered training in the sense that it may be used as part of a training process performed by the training engine 230 to generate the merchant customer base location profiles 240.

The training transaction data 235 used to generate the merchant customer base location profiles 240 may be a selected set of transaction data that may be available, which may allow for a more accurate or better-defined determination of possible base locations of a cardholder. For example, the training transaction data 235 may be from the same party of a payment card system that is to use the second system 210. For example, an issuer may have a well-defined customer demographic such that transaction data from that issuer may be used as the training transaction data 235 from which the merchant customer base location profiles 265 is derived for that issuer. As another example, the training transaction data 235 may be for a particular type of payment card that is similar to or the same as a payment card for which the determination engine 255 is to be deployed. Using a select subset of information may be particularly advantageous in situations where cardholder localization is used for purposes other than fraud detection, such as marketing, as fraudulent users may have different demographics than other users of payment card.

A record of the training transaction data 235 may include, as an example, information about a payment card of a customer, information about a transaction, and information about a merchant. For example, a record of the training transaction data 235 may include an account number of a payment card of a cardholder, a transaction date, an amount of a transaction, a description of the transaction (e.g., mail order/telephone order), and one or more merchant identifiers.

A record of the training cardholder base location data 270 may include information identifying a payment card of a cardholder, such as an account number, and one or more base locations associated with the account, such as a stated ZIP code provided by a cardholder. A record of the training cardholder base location data 270 may be looked up based on information in the training transaction data 235, such as an account number, such that, for example, a stated base location of a cardholder for a transaction may be determined.

A profile in the merchant customer base location profiles 240, 265 may include an expected distribution of customers of a particular merchant based on transactions customers have had with the particular merchant. For example, a profile of one merchant may include an expected distribution of customers as the number of customers who have transacted with the merchant for each of various customer ZIP codes. As will be discussed below, FIGS. 4A-4B include tables that represent example profiles of merchants customer base locations that may be stored as the merchant customer base location profiles 240, 265. As discussed above, the merchant customer base location profiles 240 in the first system 205 may be the same as or different from the merchant customer base location profiles 265. Differences may exist, as examples, as the merchant customer base location profiles 265 may be periodically updated based on new transaction data, the merchant customer base location profiles 265 may be derived from the merchant customer base location profiles 240 based on preferences for a particular deployment, and the like.

In the second system 210, a user 245 may interact with the second system 210 through a user interface 250 to cause the determination engine 255 to generate one or more possible base locations of a cardholder. The user interface 255 may be any type of user interface, such as a mouse-driven graphical user interface or a command-line interface. For example, the user 245 may start a program that includes the user interface 250 and the determination engine 255, and the user may select an option to generate a list of possible base locations of a cardholder based on the transaction data 260 and the merchant customer base location profiles 265.

The cardholder for which one or more possible base locations may be generated may be identified, as an example, by an account number of a cardholder account. In some implementations many different cardholder base locations may be generated as a batch. For example, an issuer may wish to determine cardholder locations monthly to determine whether cardholders may have moved to locations that differ from stated locations that are on-file. As another example, in an investigation of a person, a first and last name of a person may be used to determine all accounts associated with that first and last name, and possible base locations may be generated for each account or possible base locations may be generated based on an aggregation of information from all of the accounts.

In general, as described above, the determination engine 255 generates one or more possible base locations of a cardholder. Generating one or more possible base locations of a cardholder may involve, as an example, determining a list of merchants with which a cardholder has had transactions based on the transaction data 260, matching the list of merchants with profiles of merchants stored in the merchant customer base location profiles 265, computing geographic distribution of customers of the merchants on the list based on the profiles, and using the geographic distributions to generate one or more possible base locations of a cardholder. Using the geographic distributions to generate one or more possible base locations of a cardholder may involve sending an entire list of possible base locations and information associated with those locations that indicates an expected distribution of customers, or may involve filtering the geographic distributions. For example, a list of top ten possible base locations and their probability of being a location of the cardholder may be generated.

Output of the determination engine 255 may be stored as determinations 275, which may include, as examples, one or more possible base locations of the cardholder, or determinations based on further processing of possible base locations, such as a determination related to fraud detection based on possible base locations and other data. The output or a derivation of the output may be relayed to the user interface 250 for display to the user 245.

The transaction data 260 may be similar to the training transaction data 235, as the transaction data of both may include information about transactions between customers and merchants, which may include a transaction date, an amount of a transaction, a description of a transaction, and an identification of a merchant. In contrast to the training transaction data 235, the transaction data 260 may be part of a particular deployment that is continually updated with transaction data for that particular deployment. For example, the training transaction data 235 may be an aggregation of transaction data collected by issuers that is used by a developer and the transaction data 260 may be transaction data for a single issuer that is continually updated as cardholders perform transactions.

Although the systems 205, 210 of FIG. 2 include a certain type and number of components, implementations may vary. For example, there need not be a user interface in either or both of the systems. As an example, an application may call a determination engine to automatically generate one or more possible base locations of a cardholder (e.g., the call may be made through an application programming interface (API)). For example, an application may periodically call the determination engine to determine whether cardholder addresses (e.g., stated addresses that are on-file) match inferred addresses that are determined by the determination engine. If addresses do not match, the application may use that lack of a match to send a notification to a cardholder (e.g., a notice may be sent that indicates the address on-file might not be accurate and the cardholder may be requested to update their contact information if that is the case; e.g., a notice may include marketing material related to an inferred location) or to send an alert (e.g., to request further review for possible first-party fraud or other fraud).

As another example, there need not be a separation between two systems or there may be additional systems. For example, a single system may include the training engine 230 to generate a single set of merchant customer base location profiles and that system may also include the determination engine 255.

As another example, there may be fewer data structures. For example, the training transaction data 235 might include addresses of customers.

Figure 3:
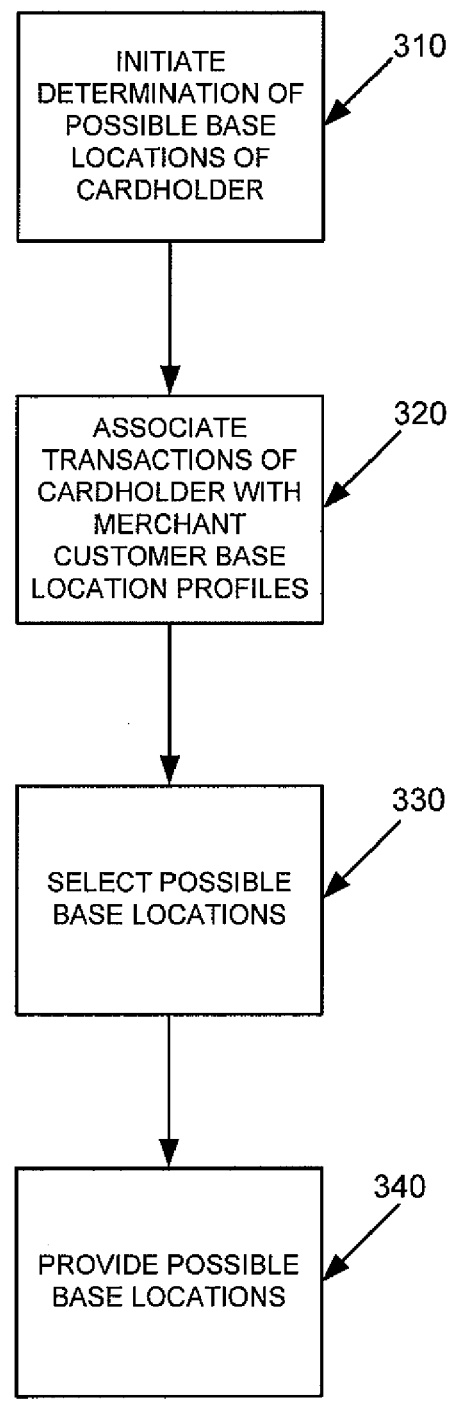
FIG. 3 is a flowchart illustrating a process of determining possible base locations of a cardholder.

FIG. 3 is a flowchart illustrating a process 300 of determining possible base locations of a cardholders The process 300 may be implemented in a system such as the system 210 of FIG. 2. For example, the determination engine 255 may perform sub-processes of the process 300. In general, the process 300 involves initiating determination of possible base locations of a cardholder (310), associating transactions of a cardholder with merchant customer base location profiles (320), selecting possible base locations (330), and providing possible base locations (340).

A determination of possible base locations of a cardholder is initiated (310). Initiating the determination may include, as examples, receiving a request to determine possible base locations for one or more cardholders (e.g., from an application, such as through an API call, or through a user interface), starting an application as part of a scheduled process to determine possible cardholder base locations on a periodic basis, and the like.

Transactions of a cardholder are associated with merchant customer base location profiles (320). The transactions may include all transactions of a cardholder or may include a subset of transactions. For example, the transactions may be restricted to a specific period of time (e.g., all transactions in a last month), there may be a filtering of types of merchants (e.g., online merchants might not be included), and the like. A restriction of transactions that are included may be based on system constraints, may be based on preferences, or a combination of the two (e.g., only transactions for a last six months may be used as they may be available for quick access and other transaction data may be archived; only transactions from a last thirty days may be chosen which may improve accuracy of a determination of possible base locations of a cardholder).

The merchant customer base location profiles may include geographic distributions of customers for each merchant having a merchant customer base location profile. For example, a merchant customer base location profile may include a vector of a number of customers having base locations of various ZIP codes for a merchant, where the ZIP codes are based on stated customer information (e.g., account profiles stored in a payment card system). The merchant customer base location profiles may be processed such that the data in the profiles may provide more accurate geographic distributions of possible base locations of customers. For example, a table of merchant customer base location profiles including numbers of customers within each five digit ZIP code for each merchant may be smoothed, normalized, or both. As the geographic distributions in the merchant customer base location profiles may be processed, they may be referred to as expected geographic distributions of customers (e.g., as they may reflect a statistical model of geographic distribution of customers rather than an exact geographic distribution).

Associating the transactions with the merchant customer base location profiles may include selecting merchant customer base location profiles of merchants with which a cardholder has had transactions. In general, merchants with which a cardholder has had transactions may be identified by transaction data of the cardholder. For example, a list of transactions a cardholder has had in a past month may be used to generate a list of merchants identified in the transactions. Then, those merchants in the list may be associated with the merchant customer base location profiles of those merchants.

Possible base locations of a cardholder are selected (330). The possible base locations of a cardholder may be a subset of base locations in the merchant customer base location profiles. For example, the merchant customer base location profiles may include data for all ZIP codes according to the ZIP plus four ZIP code system in the United States and a selection may be made of those ZIP plus four codes considered most likely to be a possible location of the cardholder.

Selecting possible base locations of a cardholder may include further processing of merchant customer base location profiles to select possible base locations of a cardholder. For example, expected geographic distributions of customers may be aggregated for those merchant customer base location profiles corresponding to merchants with whom a cardholder has had transactions. The aggregated geographic distributions may be sorted to generate a list of geographic distributions based on relative probability that one location may be a more likely base location of the cardholder than others. Whether further processing of the merchant customer base location profiles is performed or not, the process of selecting possible base locations may be referred to as deriving the possible base locations from the merchant customer base location profiles.

Possible base locations of a cardholder are provided (340). The possible base locations of cardholder may be provided to a user (e.g., through a user interface) or may be provided to a computer program (e.g., as a result of an API call).

Although the process 300 of FIG. 3 is described with certain sub-process, there may be fewer, additional, or different sub-processes. For example, the process may further include generating or updating merchant customer base location profiles.

As other examples, the process may further include using the possible base locations of a cardholder to determine whether an inferred address (e.g., a ZIP code of a possible base location) differs from a stated address (e.g., an address on-file as part of an account profile and associated with an account). Differences between a stated address and an inferred address may be used, for example, to determine whether fraud is potentially occurring, to determine that a party has moved (e.g., as an opportunity to ensure information is up to date for more accurate fraud detection based on an address on-file and as an opportunity for marketing (e.g., sending advertisements localized to a new area or ensuring payment card retention)), to track down a person (e.g., a suspected money launderer may have a known name that matches several different addresses in a database of public records and cardholder localization may be used to filter the addresses to a single address (e.g., to differentiate from other persons having a same first and last name)), to determine whether a cardholder is to be associated with multiple base locations (e.g., a person may have multiple residences or a company payment card may be associated with multiple base locations based on heavy travel; multiple base locations may be used as a marketing opportunity, e.g., to send localized advertisements with a payment card statement).

As an example of the efficiency of an implementation of the process 300, cardholders have typically been localized to a five-mile radius of their actual address, often getting a ZIP code exactly right. For example, a test that involved comparing stated addresses of public records compared against inferred addresses based on the process 300, where the inferred addresses were inferred from transaction data, for over 20,000 cardholder-specified names there was an 80% match of inferred locations with public record locations. As an example of avoiding false identifications of locations, based on more than 5,000 realistic synthetically-generated names for which random locations were generated, there was only a 0.4% match with public record locations.

As another example, an implementation of the process 300 was tested on a dataset where an actual location of a set of cardholders who were suspected of money laundering was desired to be determined. Despite efforts of cardholders to disguise their location, the actual individuals were found in a third-party address database with a ratio of 200:1 to a control group of realistic synthetically-generated names with randomly assigned ZIP codes, based on their transactions alone.

FIGS. 4A-4B are block diagrams including first and second tables 402, 404 of geographic distributions of customers of merchants. The second table 404 may be an example illustration of a result of normalizing and smoothing of the data in the first table 402 (e.g., it may be an illustration based on rough, manual smoothing of data and need not represent an actual application of smoothing computations). The tables may be used in the systems 205, 210 of FIG. 2 or in the process 300 of FIG. 3. For example, either of the tables may be the merchant customer base location profiles 240, the merchant customer base location profiles 265, or both.

Each of the first and second tables 402, 404 includes an organization of rows 406, 408 and columns 410, 412, where the rows represent merchants and the columns represent a five digit ZIP code. At the intersection of a row 406, 408 and column 410, 412 is a cell representing a likelihood that a customer of a particular merchant has a base location of a particular ZIP code. For example, in the first table 402, the first row 414 includes a label identifying a first merchant as "Marriott Hotel—Honolulu." At the intersection of the first row 414 and a first column 416, is a number 423 representing the likelihood that a customer of the Marriott Hotel Honolulu has a base location at the ZIP code 10045.

Each of the rows in the tables 402, 404 may be referred to as a merchant customer base location profile. In the tables 402, 404, a series of cells for a row represents a geographic distribution of customers of a merchant. For example, in the first table 402, the series of cells corresponding to the first row 414 represents a geographic distribution of customers across various ZIP codes.

The information in the first table 402 may be generated as a historical number of customers that have had transactions with a particular merchant or a number of transactions customers have had with a particular merchant. For example, at the intersection of the first row 414 and a first column 416, the number 423 representing the likelihood that a customer of the Marriott Hotel Honolulu resides at the ZIP code 10045 may be based on an evaluation of transaction data that indicates that 423 cardholders having a stated ZIP code of 10045 have had transactions with the Marriott Hotel Honolulu. Following that example, later cells of the first row 414 may represent a geographic distribution of cardholders that have had transactions with the Marriott Hotel Honolulu.

As discussed above, the information in the second table 404 may be a processed version of the information in the first table 402. In particular, the second table 404 may represent a smoothed version of the information. Smoothing information may eliminate or reduce entries that have a zero value such that a more accurate indication of a probability that a customer has a particular base location (e.g., resides at a particular ZIP code) may be obtained.

Smoothing of the information may be performed in accordance with the following equation: $L(z_i|m_k)=(1-w_k)P(z_i)+(w_k\, P(z_i|m_k))$; where $z_i$ represents a ZIP code 'i'; $m_k$ represents a merchant 'k'; $L(z_i|m_k)$ is an estimate of the probability that the base location of a customer of merchant k is ZIP code i; $w_k$ is computed in accordance with the function $w_k=C(m_k)/(C(m_k)+a)$ (which is a weighting function dealing with zeros as multiplying by zero would wipe out a column of information, where $C(m_k)$ is a number customers of a merchant k or the number of transactions with a merchant k, and 'a' is a constant used for smoothing (the constant may be any nonnegative integer, such as thirty)); $P(z_i)$ is the overall probability of a cardholder having a base location of a ZIP code i (e.g., $P(z_i)$ may be based on a number of cardholders in a stated zip code divided by a sample number of cardholders or may be based on a number of transactions by cardholders in a stated ZIP divided by a total number of transactions); and $P(z_i|m_k)$ is a measured probability of a cardholder having a base location of a ZIP code i for a merchant k (e.g., a number customers with stated base location ZIP code i for a merchant k divided by a total number of customers of a merchant k or a number of transactions by customers with stated base location ZIP code i for a merchant k divided by a total number of transactions for a merchant k), where $P(z_i|m_k)=C(z_i|m_k)/C(m_k)$, and $C(z_i|m_k)$ is the number customers with stated base location ZIP code i for a merchant k or the number transactions by customers with stated base location ZIP code i for a merchant k.

For example, for a merchant k having transactions with 6,749 customers, 235 of whom have a ZIP code i, $w_k$ may be 6,749/6,779 (where thirty is the constant). Following that example, the first half of the equation, $(1-w_k) P(z_i)$ for a transaction pool of 29,053 cardholders with 1,363 cardholders having a base location of the ZIP code i, may be (1-6,749/6,779)(1,363/29,053), which may be rounded to 0.0002076. The second half of the equation, $(w_k P(z_i|m_k))$, may be 6,749/6,779×235/6,749, which may be rounded to 0.0346658. Thus, an estimate of the probability that the base location of a customer of merchant k is ZIP code i may be 0.0002076+0.0346658, which is 0.0348734.

Information from either or both of the tables 402, 404 may be used to determine possible base locations of a cardholders Determining possible base locations of a cardholder may be performed in accordance with the following equation:

$$L(z_i \mid \text{transactions}) = b(P(z_i))^{1-n} \prod_k L(z_i \mid m_k);$$

where $z_i$ represents a ZIP code 'i' (e.g., any ZIP code in either of the tables 402, 404); $m_k$ represents a merchant 'k' (e.g., any of the merchants in either of the tables 402, 404); $L(z_i$ transactions) represents a probability of a cardholder having a base location of a ZIP code i given a number of transactions; 'b' is a constant that normalizes the sum of the probabilities $L(z_i$ transactions) over all $z_i$ to 1;

$$\prod_k L(z_i \mid m_k)$$

represents a product of a series of n probabilities that a cardholder has a base location of a ZIP code i given transactions with n merchants $m_k$ (e.g., a product over merchants $m_k$ the cardholder visited); and $L(z_i|m_k)$ represents a probability that a customer of merchant k has a base location of a ZIP code i.

As an example of applying the above equation to the second table 404, if a cardholder has transactions with the first two merchants, geographic distributions of probabilities may be taken from the first row 420 and a second row 422, such that two vectors of geographic distributions are 0.1743, 0.1496, 0.1404, 0.1332, 0.2130, 0.0546, and 0.1349, and 0.123652, and 0.1038, 0.1399, 0.3244, 0.0977, 0.1806, 0.1333, and 0.0202. For this example, consider further a vector of the overall probability of a cardholder having a base location of each ZIP code, $P(z_i)$, with values 0.1510, 0.1028, 0.0838, 0.0561, 0.0469, 0.2279, and 0.3314. Computing $$(P(z_i))^{1-n} \prod_k L(z_i \mid m_k)$$

entails multiplying the first two vectors element-by-element and dividing by the third vector element-by-element (for n=2, $P(z_i)^{1-n}=1/P(z_i)$). This yields the vector 0.1198, 0.2036, 0.5435, 0.2320, 0.8202, 0.0319, 0.0082. Further multiplying by b=0.5104 yields the vector 0.0612, 0.1039, 0.2774, 0.1184, 0.4186, 0.0163, 0.0042, which represents a geographic distribution of probabilities of a cardholder having a base location of one of the locations indicated by the respective ZIP codes 10045, 32345, 38234, 58493, 83102, 92011, and 92130 for a cardholder having had transactions with only the first two merchants. Given the resultant vector of geographic distributions, a determination may be made that the cardholder has a base location of the location having the ZIP code 83102 as that ZIP code has the highest resultant probability.

Although the tables 402, 404 and the corresponding descriptions include a certain number and types of features, implementations may vary. For example, although the tables 402, 404 include a certain number of ZIP codes, tables may include data for all available ZIP codes.

As another example, the tables may include data other than a historical number of transactions of cardholders having a particular base location or a smoothed version of that information. For example, the tables may store results of logarithmic computations of historical numbers of transactions. As a log of a product is equivalent to a sum of logs, the logs may be stored and the above-referenced equation may be adapted such that vectors of geographic distributions may be summed instead of multiplied. If the values are desired to be extracted from a sum of logs, the sums may be raised to the power of the base of the log applied. Storage of logs may advantageously avoid loss of values having many values trailing a decimal place and may avoid vector multiplication of large vectors of thousands of locations for a merchant (e.g., as all ZIP codes may be represented in a merchant profile, which may include over 43,000 entries).

As another example, the data in the tables may be further normalized. For example, population figures for particular ZIP codes, such as population data from a government census, may be taken into account to normalize the data. Such normalization may advantageously allow for the computation of the probabilities to compensate for differences between the geographic distributions of a payment card issuer's cardholders and the overall population, for the differences between the geographic distributions of the cardholders of two payment card issuers, or for the differences between the geographic distributions of the cardholders of a single payment card issuer over time.

As another example, the data may be broken down into a larger or smaller granularity of ZIP codes. As examples, a first three or four digits of a ZIP code, or all or some of a ZIP plus four code may be used.

As another example, location information other than ZIP code data may be used to define a location of customers of a merchant. For example, location information may include a name of a county or municipality determined based on a stated address.

As another example, equations applied to the tables may differ. For example, the equation for determining possible base locations of a cardholder need not include the constant 'b'.

As another example, hierarchical smoothing may be performed to data in the first table 402. Such a smoothing may include smoothing at a level of a ZIP-1 code (i.e., the first digit of a ZIP code), followed by a level of a ZIP-2 code (i.e., the first two digits of a ZIP code), followed by a level of a ZIP-3 code (i.e., a first three digits of a ZIP code), and so on.

As another example, values in the tables 402, 404 may include many default values such that the tables may be treated as sparsely populated. By treating the data as sparsely populated, as examples, less data may be stored (e.g., merchant customer base location profiles may be compressed) and fewer calculations may be performed.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly embodied in a computer-readable medium, the computer program product being operable to cause data processing apparatus to perform operations comprising:
   initiating a determination of one or more possible base locations of a cardholder of a payment card;
   associating transactions of the cardholder with a plurality of merchant customer base location profiles, each of the merchant customer base location profiles characterizing geographic base locations of a plurality of customers with which a merchant has had a transaction;
   deriving from the merchant customer base location profiles the one or more possible cardholder base locations; and
   providing the one or more possible base locations;
   wherein the merchant customer base location profiles comprise geographic distributions smoothed in accordance with the equation:

$$L(z_i|m_k) = (1-w_k)P(z_i) + (w_k P(z_i|m_k));$$

where:
   $z_i$ represents a ZIP code 'i'; $m_k$ represents a merchant 'k';
   $L(z_i|m_k)$ is an estimate of the probability that the base location of a customer of merchant k is ZIP code i;

$w_k$ is computed in accordance with the function $w_k=C(m_k)/(C(m_k)+a)$;

$P(z_i)$ is ab overall probability of a cardholder having a base location of a ZIP code i; and $P(z_i|m_k)$ is a measured probability of a cardholder having a base location of a ZIP code i for a merchant k;

wherein $P(z_i|m_k)=C(z_i|m_k)$, and $C(z_i|m_k)$ is the number customers with stated base location ZIP code i for a merchant k or the number transactions by customers with stated base location ZIP code i for a merchant k.

2. The product of claim 1, wherein the one or more possible base locations are derived from the merchant customer base location profiles by computing a product of probability values, each of the probability values being an estimate of a probability that a customer of a merchant has a particular base location.

3. The product of claim 2, wherein the probability values are computed from frequencies of occurrences based on a training set of transactions of the merchants, each having a corresponding plurality of associated customers.

4. The product of claim 1, wherein the merchant customer base location profiles comprise normalized geographic distributions.

5. The product of claim 1, wherein the one or more possible base locations are localized to a Zone Improvement Plan code (ZIP code) or other geocode resolution.

6. The product of claim 1, wherein the merchant customer base location profiles are derived from stated addresses of customers with which the merchants have had a transaction.

7. The product of claim 1, wherein the deriving comprises selecting the one or more possible base locations that have a highest probability of being a base location of the cardholder, the probability being based on historical transaction data from a plurality of customers.

8. The product of claim 1, wherein the operations further comprise utilizing the one or more possible base locations.

9. The product of claim 8, wherein the utilizing the one or more possible base locations comprises determining whether the one or more possible base locations differ from a stated address of the cardholder.

10. The product of claim 9, wherein the utilizing the one or more possible base locations further comprises generating a notification that the stated address differs if the determination results in an indication that the stated address differs.

11. The product of claim 8, wherein the utilizing the one or more possible base locations comprises utilizing the one or more possible base locations to target offers to specific cardholders.

12. The product of claim 8, wherein the utilizing the one or more possible base locations comprises utilizing the one or more possible base locations for fraud detection.

13. A computer-implemented method comprising:

initiating a determination of one or more possible base locations of a cardholder of a payment card;

associating transactions of the cardholder with a plurality of merchant customer base location profiles, each of the merchant customer base location profiles characterizing geographic base locations of a plurality of customers with which a merchant has had a transaction;

deriving from the merchant customer base location profiles the one or more possible cardholder base locations; and providing the one or more possible base locations;

wherein the merchant customer base location profiles comprise geographic distributions smoothed in accordance with the equation:

$$L(z_i|m_k)=(1-w_k)P(z_i)+(w_k P(z_i|m_k));$$

where:

$z_i$ represents a ZIP code 'i'; $m_k$ represents a merchant 'k';

$L(z_i|m_k)$ is an estimate of the probability that the base location of a customer of merchant k is ZIP code i;

$w_k$ is computed in accordance with the function $w_k=C(m_k)/(C(m_k)+a)$;

$P(z_i)$ is ab overall probability of a cardholder having a base location of a ZIP code i; and $P(z_i|m_k)$ is a measured probability of a cardholder having a base location of a ZIP code i for a merchant k;

wherein $P(z_i|m_k)=C(z_i|m_k)/C(m_k)$, and $C(z_i|m_k)$ is the number customers with stated base location ZIP code i for a merchant k or the number transactions by customers with stated base location ZIP code i for a merchant k.

14. The method of claim 13, wherein the one or more possible base locations are derived from the merchant customer base location profiles by computing a product of probability values, each of the probability values being an estimate of a probability that a customer of a merchant has a particular base location.

15. The method of claim 13, wherein the merchant customer base location profiles are based on stated addresses of customers with which the merchants have had transactions.

16. The method of claim 13, further comprising utilizing the one or more possible base locations.

17. A computer program product, tangibly embodied in a computer-readable medium, the computer program product being operable to cause data processing apparatus to perform operations comprising:

receiving a request for one or more possible cardholder base locations; and determining one or more possible cardholder base locations, the determining comprising:

generating a list of locations using at least one of a plurality of merchant customer base location profiles, each of the locations being a base location associated with a probability that the base location is one of the cardholder base locations, the probability derived from probabilities of a plurality of customers of merchants with which the cardholder has had a transaction having the base location, and determining the one or more possible cardholder base locations from probabilities associated with the list of locations; and providing the one or more possible cardholder base locations;

wherein the merchant customer base location profiles comprise geographic distributions smoothed in accordance with the equation:

$$L(z_i|m_k)=(1-w_k)P(z_i)+(w_k P(z_i|m_k));$$

where:

$z_i$ represents a ZIP code 'i'; $m_k$ represents a merchant 'k';

$L(z_i|m_k)$ is an estimate of the probability that the base location of a customer of merchant k is ZIP code i;

$w_k$ is computed in accordance with the function $w_k=C(m_k)/(C(m_k)+a)$;

$P(z_i)$ is ab overall probability of a cardholder having a base location of a ZIP code i; and $P(z_i|m_k)$ is a measured probability of a cardholder having a base location of a ZIP code i for a merchant k;

wherein $P(z_i|m_k)=C(z_i|m_k)/C(m_k)$, and $C(z_i|m_k)$ is the number customers with stated base location ZIP code i for a merchant k or the number transactions by customers with stated base location ZIP code i for a merchant k.

18. The product of claim 17, wherein the operations further comprise determining whether the one or more possible cardholder base locations differ from a stated address of the cardholder.

19. The product of claim 17, wherein the generating a list of locations comprises computing a product of probability values, each of the probability values being an estimate of a probability that a customer of a merchant has a particular base location.

* * * * *